United States Patent
Cass et al.

(10) Patent No.: US 6,304,674 B1
(45) Date of Patent: Oct. 16, 2001

(54) SYSTEM AND METHOD FOR RECOGNIZING USER-SPECIFIED PEN-BASED GESTURES USING HIDDEN MARKOV MODELS

(75) Inventors: Todd A. Cass, San Francisco; Lynn D. Wilcox, Portola Valley; Tichomir G. Tenev, San Jose, all of CA (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/128,255

(22) Filed: Aug. 3, 1998

(51) Int. Cl.[7] .............................. G06K 9/00; G06K 9/62; G06K 9/74; G10L 15/00; G06E 1/00
(52) U.S. Cl. ..................... 382/224; 382/103; 382/159; 382/181; 382/228; 704/232; 704/256; 706/20
(58) Field of Search ................................ 382/181, 186, 382/187, 224, 155, 159, 228, 103; 704/243, 245, 256, 202, 232; 706/20

(56) References Cited

U.S. PATENT DOCUMENTS

| | | | |
|---|---|---|---|
| 5,502,774 | * 3/1996 | Bellegarda et al. | 704/256 |
| 5,644,652 | * 7/1997 | Bellegarda et al. | 382/186 |
| 5,649,023 | * 7/1997 | Barbara et al. | 382/159 |
| 5,687,254 | 11/1997 | Poon et al. | 382/229 |
| 5,768,423 | * 6/1998 | Aref et al. | 382/228 |
| 5,781,663 | * 6/1998 | Sakaguchi et al. | 382/189 |
| 5,806,030 | * 9/1998 | Junqua | 704/245 |
| 5,842,165 | * 11/1998 | Raman et al. | 704/256 |
| 5,875,256 | * 2/1999 | Brown et al. | 382/186 |

FOREIGN PATENT DOCUMENTS 0 464 467 A2  1/1992  (EP) .

OTHER PUBLICATIONS x "Similarity Measure of Hidden Markov Models", IBM Technical Disclosure Bulletin, Dec. 1991, pp. 326–329.*

Yang, et al. "Gesture Interface: Modeling and learning", IEEE, 1994, pp. 1747–1752.*

Young "Competitive Training in Hidden Markov Models", IEEE, 1990, pp. 681–684.*

L. R. Rabiner, "A Tutorial on Hidden Markov Models and Selected Applications in Speech Recognition", *IEEE—Stochastic Approaches*, pp. 267–296 (1989).

George M. Miller, "On–Line Recognition of Hand–Generated Symbols", *University of California—Fall Joint Computer Conference, 1969*, pp. 399–412.

Joonki Kim, "On–Line GestureRecognition By Feature Analysis", *Vision Interface '88*, Edmonton Convention Centre, pp. 51–55 (Jun. 6–10, 1988).

Dean Rubine, "Specifying Gestures by Example", *Computer Graphics*, vol. 25, No. 4, pp. 329–337, (Siggraph '91, Las Vegas) (Jul. 1991).

Kyoji Hirata et al., "Rough Sketch–Based Image Information Retrieval", *NEC Research & Development*, vol. 34, No. 2, pp. 263–273, Japan (Apr. 1993).

Thierry Paquet et al., "Recognition of Handwritten Sentences Using a Restricted Lexicon", *Pattern Recognition*, vol. 26, No. 3, pp. 391–407 (1993).

Walid Aref et al., "The Handwritten Trie: Indexing Electronic Ink", *Matsushita Information Technology Laboratory*, Princeton, NJ, pp. 1–25 (Oct. 1994).

Daniel Lopresti et al., "On the Searchability of Electronic ink", *The Fourth International Workshop on Frontiers in Handwritting Recognition*, Grand Hotel, Taiwan, pp. 156–165 (Dec. 1994).

* cited by examiner

Primary Examiner—Bhavesh Mehta
Assistant Examiner—Daniel G. Mariam
(74) *Attorney, Agent, or Firm*—Fay, Sharpe, Fagan, Minnich & McKee, LLP

(57) ABSTRACT

A method for recognizing user specified pen-based gestures uses Hidden Markov Models. A gesture recognizer is implemented which includes a fast pruning procedure. In addition, an incremental training method is utilized.

11 Claims, 7 Drawing Sheets

SYSTEM AND METHOD FOR RECOGNIZING USER-SPECIFIED PEN-BASED GESTURES USING HIDDEN MARKOV MODELS

CROSS-REFERENCE TO RELATED APPLICATION

A patent related to the present application is commonly assigned U.S. Pat. No. 5,687,254 to Poon, et al. entitled "Searching and Matching Unrecognized Handwriting" (issued Nov. 11, 1997; filed Jun. 6, 1994), which is incorporated herein by this reference.

BACKGROUND OF THE INVENTION

This invention relates to a system and method for recognizing user specified pen-based gestures. More particularly, the method utilizes Hidden Markov Models (HMMs) that are applied to an incremental training procedure and a recognition procedure that incorporates a fast pruning approach.

While the invention is particularly directed to the art of gesture recognition and training therefor, and thus will be described with specific reference thereto, it will be appreciated that the invention may have applicability to other areas, such as speech recognition and word matching for pen-based systems.

By way of background, an active and rapidly growing area of personal computing today, both in the academic and commercial arenas, involves computers using pen-based user interfaces. Examples of such devices incorporating pen-based user interfaces include Personal Digital Assistants (PDAs) which are useful for maintaining personal information such as notes, calenders, etc. Recognition of pen gestures—which form the basis of command and data input—is a very important factor in the success of PDAs and other pen-based systems.

More specifically, single stroke gestures provide an intuitive user interface and are useful for editing text and graphics in much the same way as a teacher would use special correlation characters when grading students' homework. Furthermore, use of recognizable gestures is necessary for devices which lack keyboards and rely entirely on pen-based input.

Presently, there are a number of applications in which gestures form a part of the user interface. However, there are numerous problems with creating a reliable recognition scheme. The main problem is the large variety of gesture types and wide variability in the manners in which different users may draw the ago same gesture.

The variety of gestures presents a problem in selecting the characteristic which best distinguishes between gestures. For instance, that which distinguishes a square from a circle is the corners. However, this is not a valid distinction if one desires to distinguish a square from a rectangle. Accordingly, it is difficult to choose a distinguishing feature even if the gestures to be recognized are known, let alone if the gesture is not known in advance.

On the other hand, choosing characteristics that are too particular also limits the range of gestures that can be successfully distinguished. For instance, if a feature set for a square includes four corners and specific dimensional data, then only squares satisfying that criteria will be recognized, not all squares.

Known gesture recognizers require improvements. First, in some cases, the accuracy of these gesture recognizers is not acceptable for use in real world applications. When too many errors are made during gesture recognition, the user will usually revert to clumsier but more accurate input devices such as the keyboard or pull down menus.

Second, the recognizers that are known are specifically designed around a fixed set of gestures—the application is restricted to gestures in this predefined set. In some applications, this is an undesirable restriction. In addition, the user must often draw the gestures in the way prescribed by the system in order for them to be correctly recognized.

Third, in traditional approaches to recognition, a gesture is run through, or processed by, a recognizer and a likelihood that the subject gesture belongs to each of a variety of classes in the recognizer is determined, and nothing else. Accordingly, the class having the best likelihood is determined but that class is not necessarily the correct class. It is only the class with the best likelihood. Thus, the results are unreliable and not reached efficiently.

It would, therefore, be desirable to include in the process a normalization (or a ground level or threshold) to determine that the best class is, at the very least, above a certain level. This feature is not present in known gesture recognition systems.

The present invention contemplates a new and improved gesture recognition method which resolves the shortcomings of the prior schemes.

SUMMARY OF THE INVENTION

A method for use in a system for recognizing user specified gestures is provided. The method and system are reliable, utilize incremental training to adapt to user needs and efficiently handle recognition.

In one aspect of the invention, Hidden Markov Models (HMMs) are used to incrementally train a system on particular gestures.

In another aspect of the invention, a procedure for recognition of input gestures that includes a fast pruning method is used. The fast pruning procedure includes comparing HMMs to HMMs, as opposed to comparing gestures to HMMs, to eliminate HMMs that do not satisfy predetermined threshold criteria relative to the gesture. Comparing HMMs to HMMs is convenient relative to comparing a gesture to HMMs because HMMs can be compared based on a limited number states (e.g. twelve (12) in the preferred embodiment) whereas comparing a gesture to an HMM requires alignment of forty (40) to fifty (50) features with the states of the HMM. For pruning purposes according to the present invention, comparisons involving twelve states is sufficient.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement and/or combination of the various parts and steps, whereby the objects contemplated are attained and hereinafter more fully set forth, specifically pointed out in the claims, and illustrated in the accompanying drawings in which:

DESCRIPTION OF THE PREFERRED EMBODIMENTS

Figure 1:
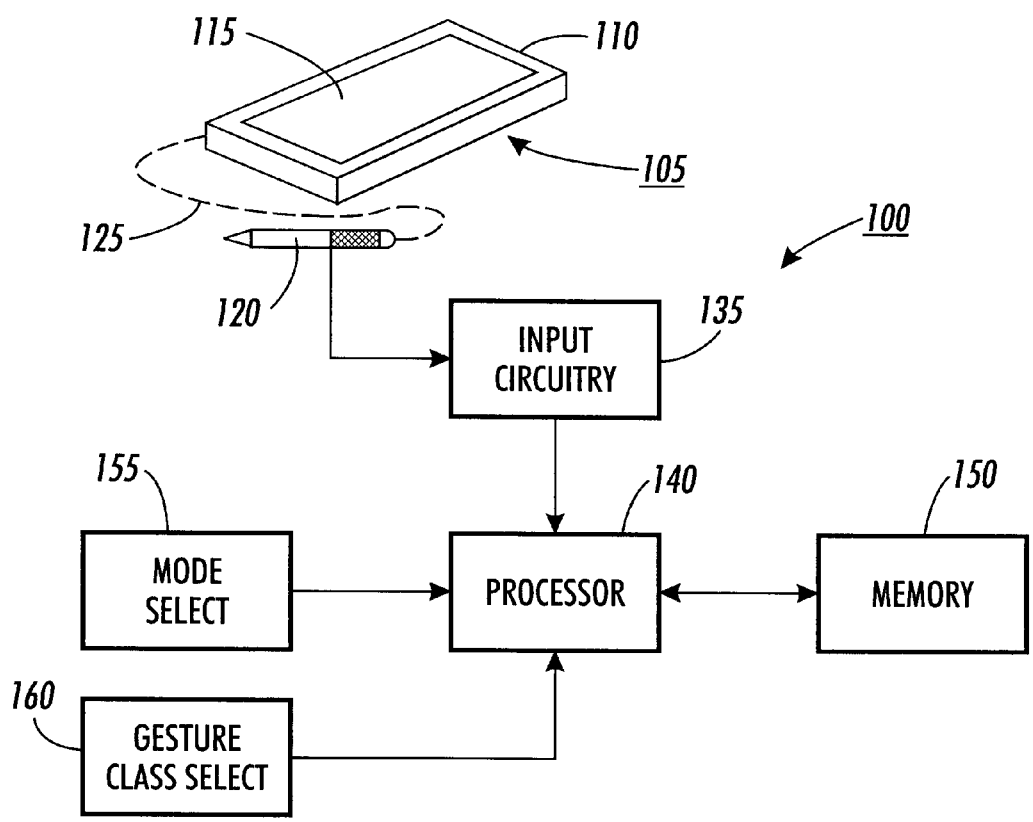
FIG. 1 illustrates an example of a system incorporating the method according to the present invention.

Referring now to the drawings wherein the showings are for purposes of illustrating the preferred embodiments of the invention only and not for purposes of limiting same, FIG. 1 provides a view of an exemplary system 100 utilizing the method according to the present invention.

More particularly, the system 100 includes a gesture source 105 which, in one embodiment, may include electronic tablet 110 having a display area 115 that can be written on with an electronic light pen 120. Pen 120 is connected to the tablet 110 through connection 125. It should be appreciated that the electronic table 110 may be a stand-alone device, or may be incorporated into a variety of pen-based systems, including personal digital assistants.

The gestures from the gesture source 105 are fed to input circuitry 135 and then processed by processor 140. A memory 150 interacts with the processor to implement the method of the present invention. The memory may be configured to provide a variety of functions to the system, such as data and instruction storage. It is to be recognized that memory 150 is only representatively shown and could be implemented in a variety of manners that are well known to those skilled in the art.

In addition, the system 100 includes a mode select module 155 for selectively initiating the training mode and recognition mode of the system and a gesture class select module 160 for identifying the gesture class (e.g. shape, letter, etc.) into which an input gesture is to be grouped during the training mode. It is to be appreciated that the modules 155 and 160 may in practice be embodied in a variety of forms that will be apparent to those skilled in the art. For example, in a PDA environment, the mode select module 155 may be a slide switch having training or recognition as switching options. The gesture class select module 160 may be an array of buttons corresponding to all letters, numbers, shapes, etc. Of course, the modules may alternatively be implemented as a touch-screen or point-and-click application. In other pen-based systems, the implementations of these features will, of course, vary.

Figure 2:
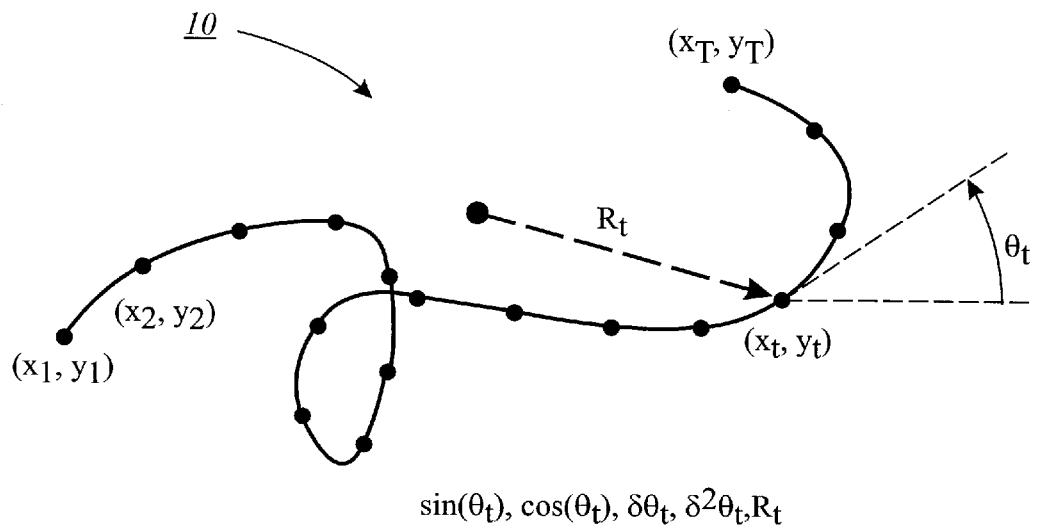
FIG. 2 illustrates an example of a single stroke pen gesture utilized in connection with the present invention.

Referring now to FIG. 2, an example is illustrated of a single stroke pen-based gesture 10 that is input to, for example, a system 100 that incorporates the method of the present invention. As shown, the gesture 10 is initially sampled at equally spaced time intervals and is defined as the trajectory of the pen between pen down and pen up positions. Once the gesture 10 is completed, it is resampled at equally spaced intervals $(x_t, y_t)$ along the gesture. This resampling is known to improve robustness of pen based recognizers. The features computed are 1) sin of the tangent angle $\theta_t$ of the trajectory, 2) cosine of the tangent angle $\theta_t$, 3) the derivative of the current tangent angle $\delta\theta_t$, 4) the second derivative of the current tangent angle $\delta^2\theta_t$ and 5) the distance $R_t$ of the current point from the center of the gesture.

Figure 3:
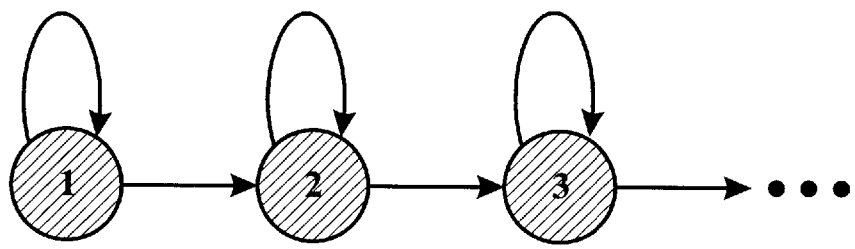
FIG. 3 is a diagrammatic representation of the topology of the Hidden Markov Models utilized in connection with the present invention.

In the preferred embodiment of the invention, Hidden Markov Models (HMMs) are used to facilitate recognition of gestures. Preferably, the HMM used is a 12-state left-to-right model, in which each state must be visited sequentially, with uniform transitions and output distributions. The basic topology is shown in FIG. 3. Each state has a Gaussian output distribution characterized by a mean vector. The same basic topology is used for all gestures, so that the user is free to define arbitrary gestures.

HMMs are well known. A useful text in explaining the basics thereof, particularly as applied in the present invention, is L. R. Rabiner, *A Tutorial on Hidden Markov Models and Selected Applications in Speech Recognition*, I.E.E.E.—Stochastic Approaches, pp. 267–296 (1989), which is incorporated herein by this reference. Briefly, the Rabiner tutorial defines a Hidden Markov Model as a model that is a doubly embedded stochastic process with an underlying stochastic process that is not observable (it is hidden), but can only be observed through another set of stochastic processes to produce the sequence of observations. In the present invention, the hidden stochastic process is the determination of which type of gesture to write, while the observable stochastic process is the pen strokes that are actually made to form the gesture.

As explained in the Rabiner tutorial, an HMM is characterized by the number of states in the model for which there is some physical significance attached to the states (N), the state transition probability distribution (A), the observation symbol probability distribution ($B_n$) for each state where n=1 . . . N, and the initial state distribution ($\pi$).

In a left-to-right HMM, the underlying state sequence associated with the model is the property that, as time increases, the state index increases, or proceeds from left to right, as shown in FIG. 3. The principal property of the left-to-right model is that there are no transitions to states whose indices are lower than the current state. In addition, for the initial state, the initial state distribution $\pi$ is zero— when the index is not equal to 1— or 1— when the index is equal to 1.

Before gesture recognition can take place, training must be initiated. A gesture is trained by providing the system with a number of examples of the gesture. The training method is dynamic, so that all the training data for a particular gesture is not needed before training can begin. Rather, the system can adapt to new users, or changes in a particular user's style, by incrementally providing more training data. Because a single basic model topology is used for all gestures, and because there can be significant variability in the way a gesture is drawn as between separate users and even within a single user's drawing habits, the training algorithm provides for multiple models per gesture.

The training method is performed incrementally on each new training sample. As noted above, the base HMM is defined to be a 12-state Hidden Markov Model with uniform transitions and output distributions. Such a model is used to initialize the training. When the first sample for a gesture is presented to the system, a model for that gesture is obtained by using the single instance of the gesture to train the base HMM, preferably by the well known Baum-Welch training method. This trained HMM is then added to the list of models for that gesture. When a subsequent sample of the gesture is obtained, a distance, or score, between it and all pre-existing models for the gesture is computed. If this distance exceeds a threshold, a new model is added for that gesture. The new model is trained using the base HMM as with the first instance of the gesture. Otherwise, the gesture is merged with the existing model that is closest to it.

Figure 4:
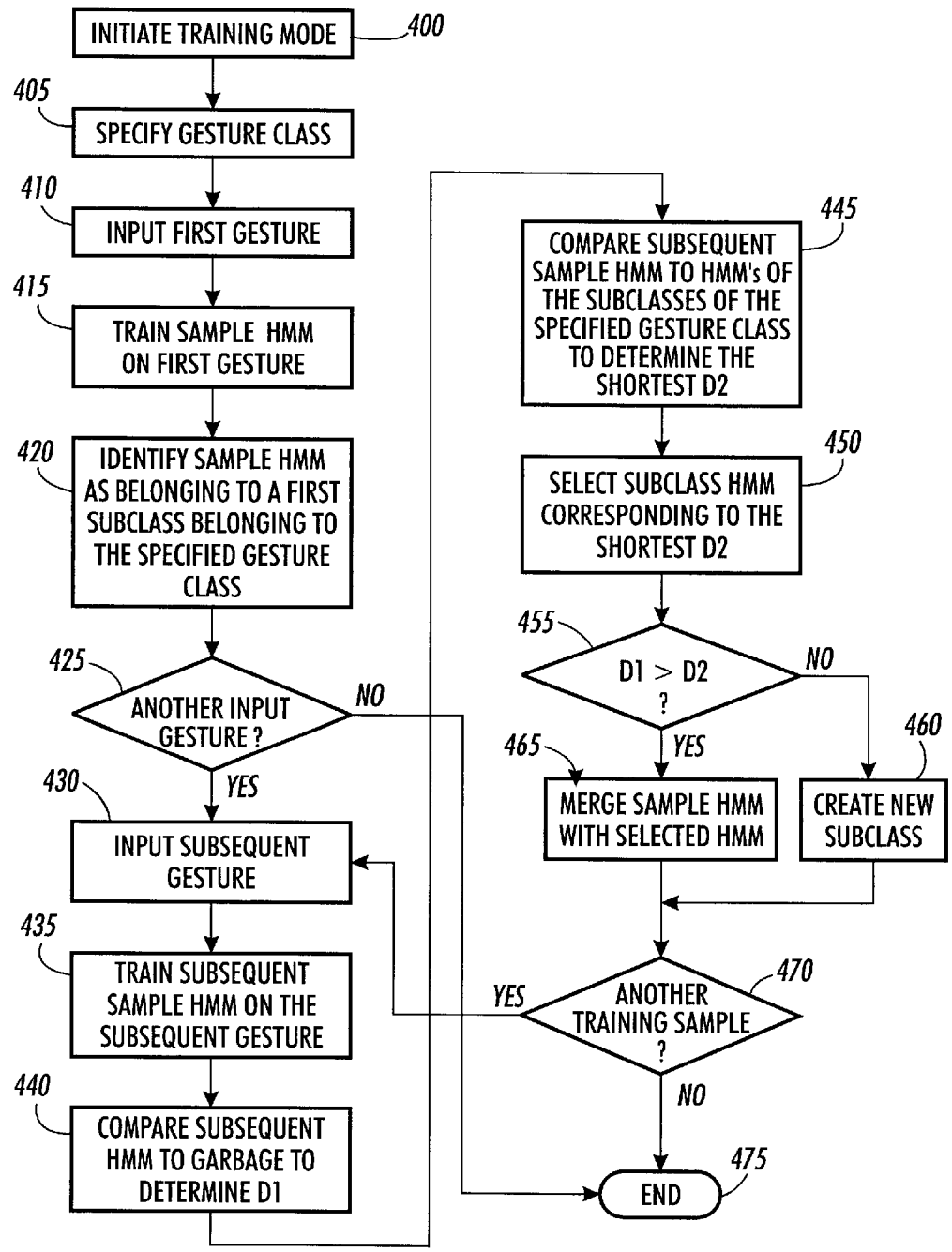
FIG. 4 is a flow chart illustrating an initial training mode according to the present invention.

More particularly, with reference to FIG. 4, the training mode of the system is initiated by selecting the training mode via the mode select module 155 (step 400) and a gesture class identity, e.g. a circle, square, particular letter, etc., to which a particular gesture is intended to belong is specified by manipulating the gesture class select module 160 (step 405). A first gesture is input (step 410) and a sample HMM is trained on the first gesture (step 415). In the case where the gesture is the first gesture input relative to a specified gesture class, the sample HMM is identified as belonging to a first subclass belonging to the specified gesture class (step 420).

Figure 8:
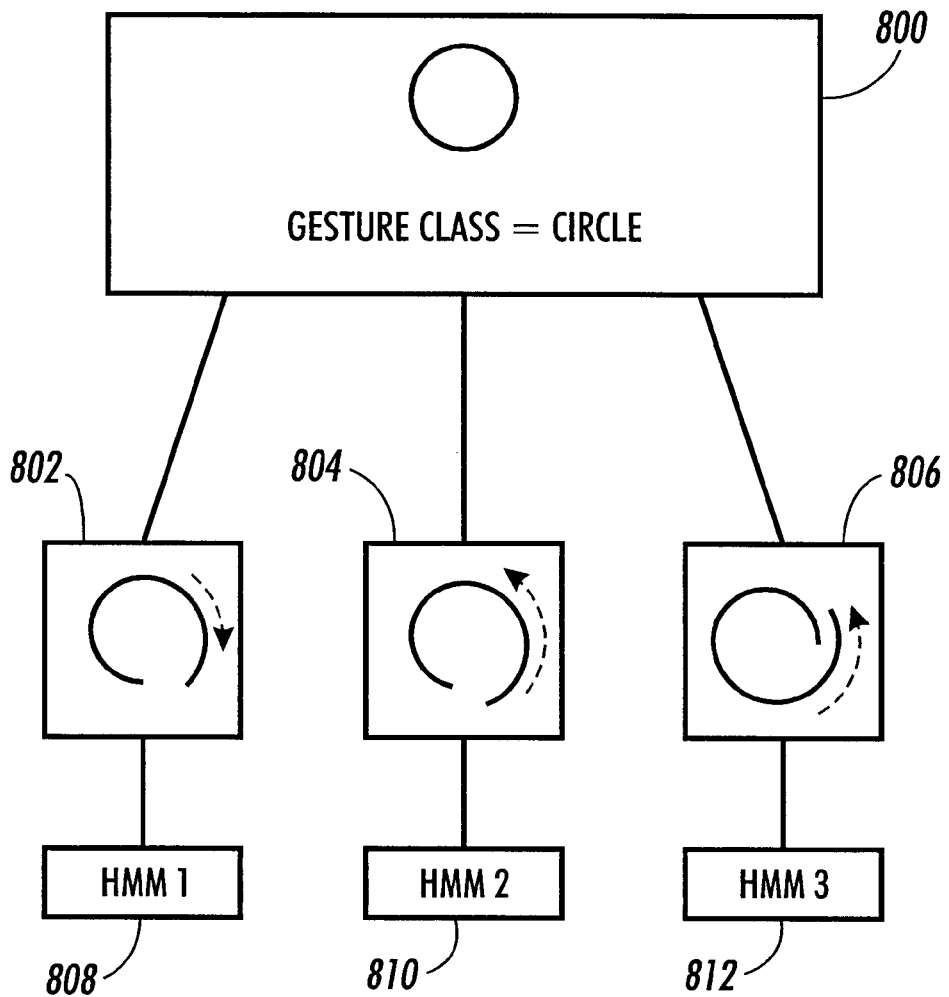

For clarity, referring now to FIG. 8, gestures may be categorized on a number of levels. For example, a circle may be classified in a gesture class 800; however, the circle may be drawn a number of different ways so it may also be represented by a subclass which corresponds to an HMM. As shown, subclasses 802, 804 and 806 may exist for a circle drawn clockwise, counterclockwise, and counterclockwise with an overlap, respectively. These examples correspond to HMMs 808, 810, and 812, respectively. Of course, the number of subclasses for any given gesture class will depend on the user.

Further, it should be noted that the present method utilizes training of a sample HMM on a single input gesture. This is a procedure not typically utilized in the recognition field because training a sample HMM on a single gesture will result in only a recognition of that particular instance and nothing else. This is because, in training HMMs, standard deviations are calculated at each node. So, if only a single gesture is sampled, the standard deviation is theoretically zero. However, if the standard deviation is preset to a predetermined level that defines a threshold under which the standard deviation cannot fall below, e.g. 0.2, then the HMM will not be trained to only a particular instance and will compensate for excessive specificity in the HMM. Setting the standard deviation to a level is tantamount to introducing "noise" into the system.

Referring back to FIG. 4, a determination is then made whether further training samples, or gestures, are to be input (step 425). If not, training is ceased (step 475). If a subsequent gesture in the specified gesture class is input (step 430), a subsequent sample HMM is trained on the subsequent gesture (step 435). A distance D1 is then determined by comparing the sample HMM to "garbage" HMMs (step 440)

Garbage HMMs act as a threshold value according to which training decisions are made. In general, it is difficult to set a fixed threshold on the distance between the gesture and the existing model which is optimal for all gestures. This is due to the variability in the forward score. Thus, the threshold is computed by creating an HMM for "garbage" gestures. The garbage model is initialized with a random set of gestures, and can be updated by merging in new gestures. Since the garbage model is created as an average of all gestures, i.e. an overtrained model, it will model no one gesture very well. However, it serves to normalize the forward score. Thus, when the distance from a gesture to a model exceeds the distance of the gesture to the garbage class, a new model is formed.

When two (2) HMMs are compared, the comparison is accomplished state by state. The distance between state i for the gesture modeled by HMM 1 and the gesture modeled by HMM 2 is $$d_i = -\frac{1}{2}\left(\log\left(\frac{B_i^1(\mu_i^2)}{B_i^2(\mu_i^2)}\right) + \log\left(\frac{B_i^2(\mu_i^1)}{B_i^1(\mu_i^1)}\right)\right)$$

where $u_i^1$ and $u_i^2$ are the means of the Gaussian distributions for state i of HMMs 1 and 2 respectively, and $B_i^1(u_i^2)$ is the output probability density for state i of HMM 1 evaluated at $u_i^2$. The distance between the two gesture models is the sum of the distances between the 12 states.

Comparing HMMs to HMMs is convenient relative to comparing a gesture to HMMs because HMMs have a limited number states (e.g. twelve (12) in the preferred embodiment) whereas a gesture may have forty (40) to fifty (50) features.

A distance D2 is determined in the same manner based on a comparison of the sample HMM and HMMs of the existing subclasses (step 445). Of those existing subclasses, the HMM corresponding to the subclass having the shortest distance D2 is selected (step 450). A comparison is then made between the distance D1 and the shortest distance D2 (step 455). If D2 is greater than D1, a new subclass of gestures is created (step 460). If D1 is greater than the shortest D2, that is, if the distance is less than the threshold, the two models are merged (step 465).

Merging is accomplished using a weighted average of corresponding state output distributions and transitions. Weights are computed by storing with each state the number of observations that were used to train that state. Weighted averages of transition probabilities and means for the Gaussian state output distributions are compared.

Figure 5:
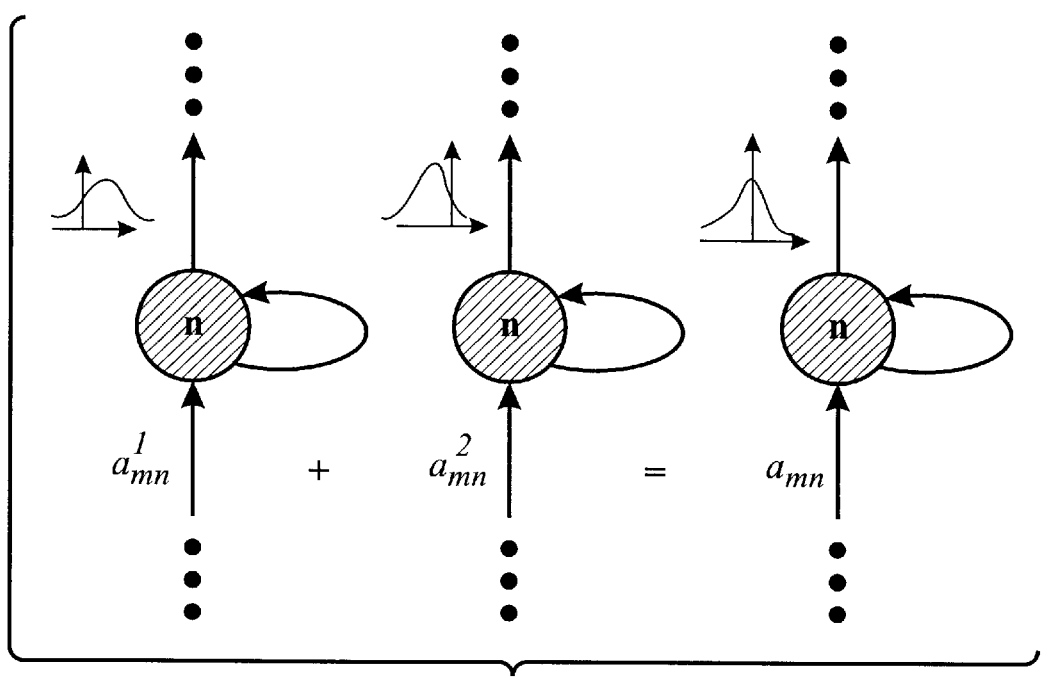
FIG. 5 is a graphic illustration illustrating the merging of two (2) HMM's according to the present invention.

Merging of HMMs is representatively shown in FIG. 5. Such merging produces a new HMM which is effectively trained on all examples used to train the original two (2) HMMs. Merging allows a HMM to dynamically adapt to new instances. The operation is both commutative and associative.

Referring back to FIG. 4, a determination is then made whether another training sample is to be input (step 470). If so, the new gesture is input and steps 430–470 are repeated. If not, the training procedure is ended (step 475).

Figure 6:
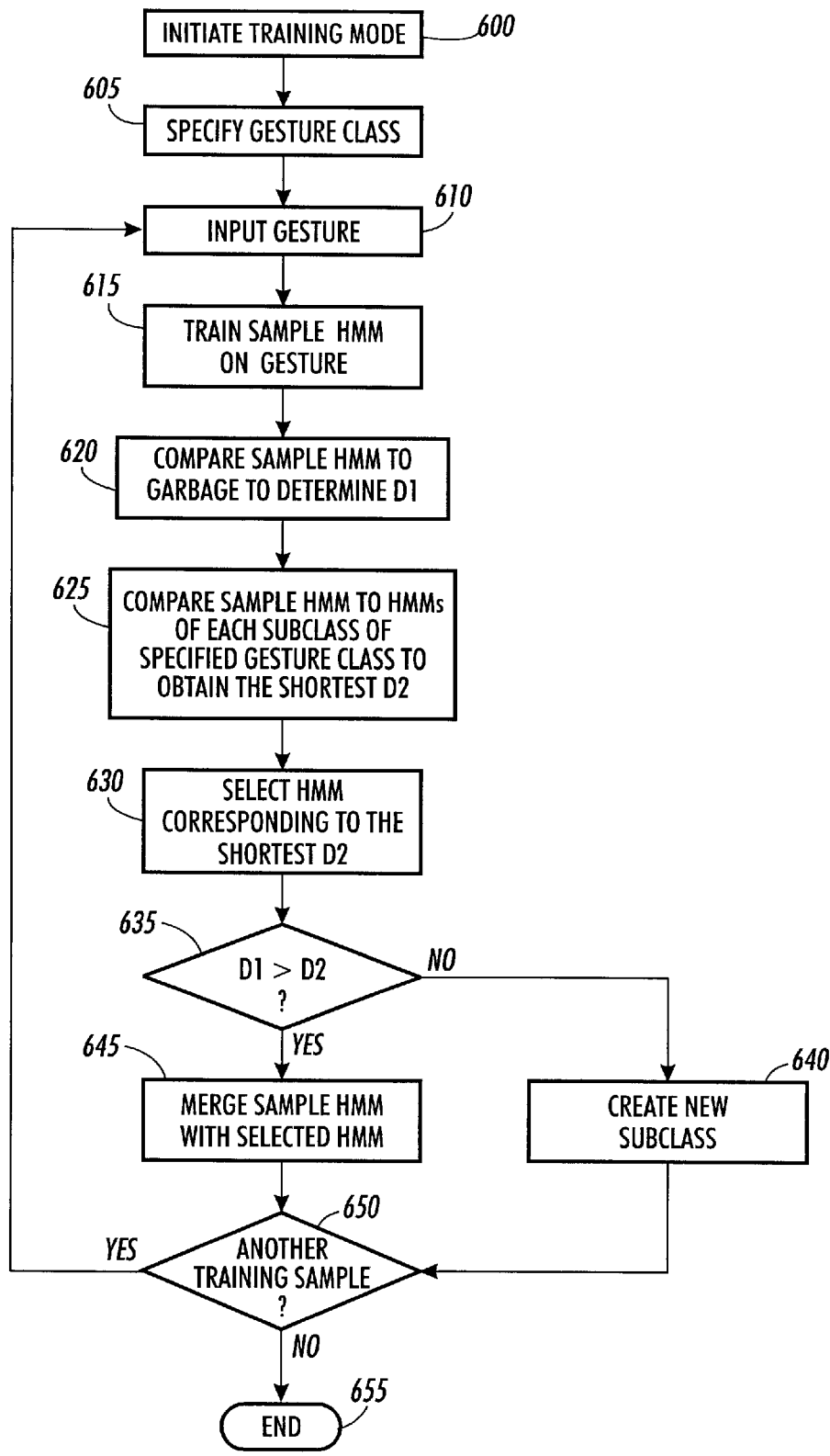
FIG. 6 is a flow chart representing a training mode according to the present invention.

With reference to FIG. 6, it is to be appreciated that the training mode may be initiated in the system using the mode select module 155 (step 600) at any point in time to incrementally train the system. Once the training mode is initiated, the gesture class to which a particular gesture is intended to belong is specified via the gesture class select module 160 (step 605). The gesture is input (step 610) and a sample HMM is trained on the gesture (step 615). At that point, the sample HMM is compared to "garbage" to determine a distance D1 (step 620), as above. The sample HMM is then compared to HMMs of each of the preexisting subclasses of the specified gesture class to obtain respective distances D2 (step 625). A single HMM of the HMMs of the preexisting subclasses is selected based on the shortest distance D2 that is determined (step 630). A comparison is then made between D1 and the shortest D2 (step 635). If D1 is less then D2, a new subclass of gestures is created (step 640). If D1 is greater than the shortest D2, the HMMs are merged (step 645). A determination is then made whether another training sample is to be input (step 650). If so, steps 610–645 are repeated. If not, the training mode is ended (step 655).

Recognition is based on a standard algorithm for computing the forward probabilities, which computes the probability of the gesture relative to a given Hidden Markov Model. Such a standard algorithm (sometimes referred to as a "standard forward algorithm") is well known and described, for example, in L. R. Rabiner, *A Tutorial on Hidden Markov Models and Selected Applications in Speech Recognition*, I.E.E.E.—Stochastic Approaches, pp. 267–296 (1989), which is incorporated herein by this reference. Since there may be multiple models per gesture corresponding to the subclasses, the recognition score for a gesture is the minimum of the forward scores for each of the models. Recognition, of course then, is based on the gesture with the best score.

More particularly, when recognition of an unknown gesture is performed, the forward score must be computed for each model of each gesture. Since the number of models per gesture can be as large as 10, and since computing the forward score is expensive, a fast pruning is first conducted. The fast pruning is accomplished by computing the distances defined in the previous section for adaptive training, and is based on a state by state comparison of the HMM for the gesture and the preexisting HMMs. Only certain models—for which the fast pruning procedure determines that the model satisfies the threshold criteria—have the forward score actually computed. The threshold is again based on the score of the comparison of the sample HMM for the gesture with the garbage model HMM.

That is, as noted above, the fast pruning procedure includes comparing HMMs to HMMS, as opposed to comparing gestures to HMMs, to eliminate HMMs that do not meet a predetermined threshold relative to the gesture. For pruning purposes according to the present invention, comparisons involving twelve states is sufficient.

Figure 7:
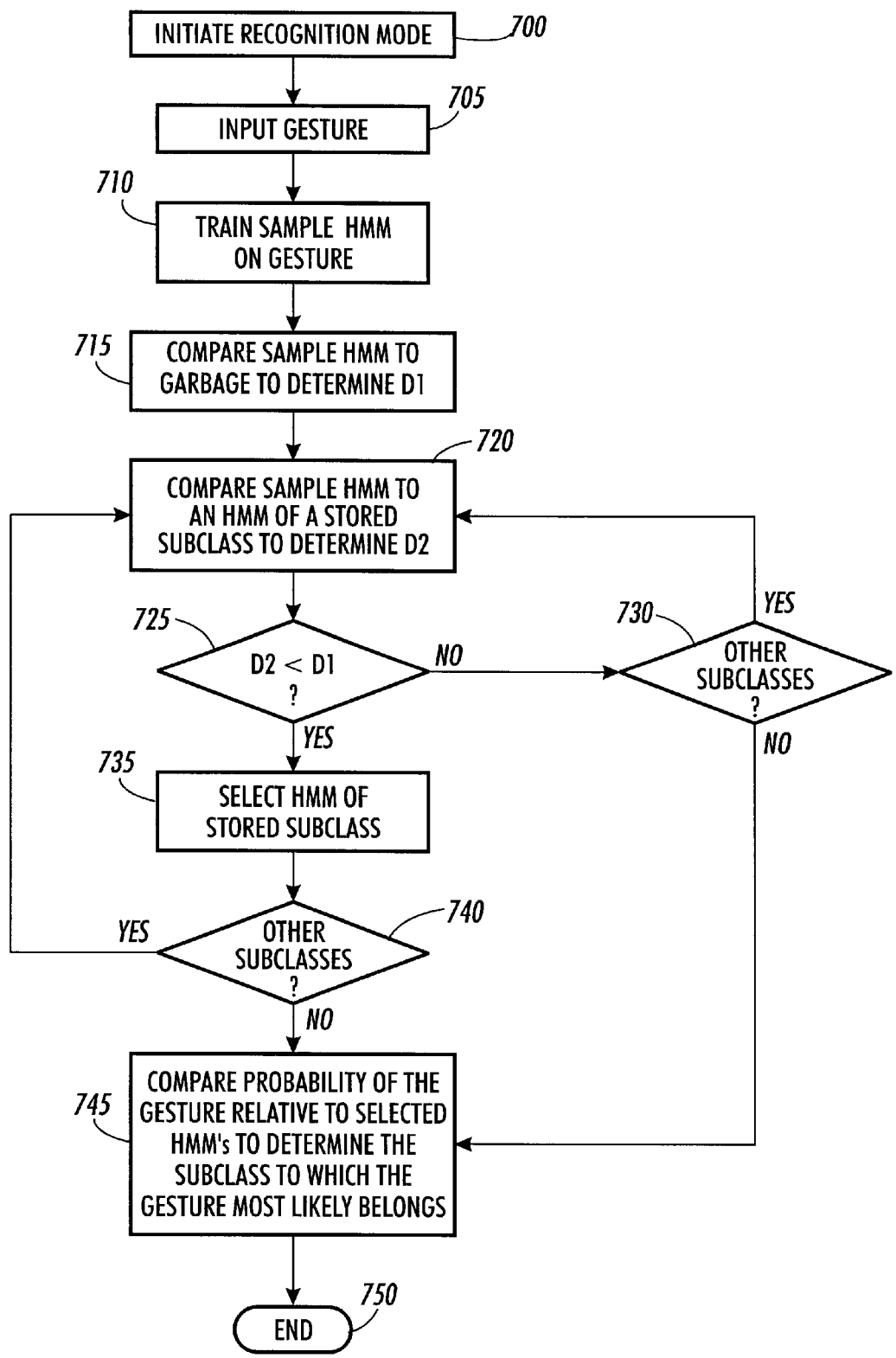
FIG. 7 is a flow chart representing a gesture recognition mode according to the present invention; and, FIG. 8 illustrates an example of a gesture class and corresponding subclasses.

With reference to FIG. 7, the recognition mode is initiated by manipulating the mode select module 155 (step 700) and a gesture is input (step 705). A sample HMM is trained on the input gesture (step 710). The sample HMM is compared to "garbage" to determine D1, e.g. a first distance or first data (step 715). The sample HMM is then compared to an HMM of a stored preexisting subclass to determine D2, e.g. a second distance or second data (step 720). A comparison is then made between D2 and D1 (step 725). If D2 is not less than D1, a determination is made whether other subclasses need to be compared to the sample HMM (step 730). If so, step 720 and step 725 are repeated. If no other subclasses are to be compared, the procedure advances to step 745, which will be described below. If D2 is less than D1, that particular HMM is selected (step 735) and then a determination is made as to whether other subclasses need to be compared to the sample HMM (step 740). If other subclasses for comparison exist, steps 720–740 are performed again. If no other subclasses are to be compared, the probability of the gesture relative to the selected HMMs is computed using the standard forward algorithm noted above to determine the subclass to which the gesture most likely belongs (step 745). Of course, once the subclass is determined, the gesture class to which the determined subclass belongs consequently becomes known. The procedure is then completed (step 750).

The above description only provides a disclosure of particular embodiments of the invention and is not intended for the purpose of limiting the same thereto. As such, the invention is not limited only to the above described embodiments, but it is recognized that one skilled in the art could conceive alternative embodiments that fall within the scope of the invention.

Having thus described the invention, we hereby claim:

1. A method adapted for use in a system for recognizing user specified gestures, the method comprising steps of:

a) initiating a training mode of the system;

b) specifying a gesture class to which a first single gesture belongs, a gesture class comprising at least one subclass of gestures;

c) inputting the first gesture to the system;

d) training a first sample Hidden Markov Model (HMM) on the first gesture, the first sample HMM being classified in the at least one subclass that belongs to the specified gesture class;

e) inputting a subsequent gesture to the system, the subsequent gesture belonging to the specified gesture class;

f) training a subsequent sample HMM on the subsequent gesture;

g) comparing the subsequent sample HMM to a threshold HMM to determine therebetween a first distance;

h) comparing the subsequent sample HMM to one of an HMM and HMMs of the at least one subclass belonging to the specified gesture class to determine therebetween one of a second distance and second distances;

i) selecting a single HMM of the one of HMM and HMMs of the at least one subclass corresponding to a shortest second distance;

j) merging the subsequent sample HMM with the selected single HMM if the first distance is greater than the second distance whereby the selected single HMM is modified;

k) creating a new subclass, comprising the subsequent sample HMM, if the first distance is less than the shortest second distance; and, l) performing steps e) through k) for subsequent gestures belonging to the specified gesture class that are input to the system.

2. The method as set forth in claim 1 further comprising presetting a standard deviation threshold level.

3. A method adapted for use in a system for recognizing user specified gestures wherein a specified gesture class has been initialized to include at least one single input gesture, the method comprising steps of:

a) inputting a subsequent gesture to the system, the subsequent gesture belonging to the specified gesture class;

b) training a subsequent sample HMM on the subsequent gesture;

c) comparing the subsequent sample HMM to a threshold HMM to determine therebetween a first distance;

d) comparing the subsequent sample HMM to an HMM or HMMs of at least one subclass belonging to the specified gesture class to determine therebetween a second distance or distances;

e) selecting a single HMM of the HMMs of the at least one subclass corresponding to a shortest second distance;

f) merging the subsequent sample HMM with the selected single HMM if the first distance is greater than the second distance whereby the selected single HMM is modified; and, g) creating a new subclass, comprising the subsequent sample HMM, if the first distance is less than the shortest second distance.

4. The method according to claim 3 further comprising performing steps a) through g) for additional subsequent gestures belonging to the specified gesture class that are input to the system.

5. The method as set forth in claim 3 wherein a standard deviation is set to a preselected threshold level.

6. A method adapted for use in a system for recognizing user specified gestures, the method comprising steps of:

inputting a single gesture;

training a sample Hidden Markov Model (HMM) on the single gesture;

comparing the sample HMM to a threshold HMM to determine therebetween a first distance;

sequentially comparing the sample HMM to a plurality of HMMs to determine respective second distances between the sample HMM and each of the plurality, each of the plurality representing a subclass of gestures;

selecting HMMs of the plurality that correspond to second distances that are less than the first distance;

computing the probability of the gesture relative to the selected HMMs of the plurality; and, determining a subclass to which the gesture most likely belongs based on the computing.

7. A method adapted for use in a system for recognizing user specified gestures, the method comprising steps of:

inputting a single gesture;

training a sample Hidden Markov Model (HMM) on the single gesture;

comparing the sample HMM to a threshold HMM to obtain first data;

sequentially comparing the sample HMM to a plurality of HMMs to determine second data;

selecting HMMs of the plurality based on the first and second data;

computing the probability of the gesture relative to the selected HMMs of the plurality; and, determining a subclass to which the gesture most likely belongs based on the computing.

8. A system for recognizing user specified gestures, the system comprising:

means for initiating a training mode of the system;

means for specifying a gesture class to which a first single gesture belongs, a gesture class comprising at least one subclass of gestures;

means for inputting the first gesture to the system;

means for training a first sample Hidden Markov Model (HMM) on the first gesture, the first sample HMM being classified in the at least one subclass that belongs to the specified gesture class;

means for inputting a subsequent gesture to the system, the subsequent gesture belonging to the specified gesture class;

means for training a subsequent sample HMM on the subsequent gesture;

means for comparing the subsequent sample HMM to a threshold HMM to determine therebetween a first distance;

means for comparing the subsequent sample HMM to an HMM or HMMs of the at least one subclass belonging to the specified gesture class to determine therebetween a second distance or distances;

means for selecting a single HMM of the HMM of the at least one subclass corresponding to a shortest second distance;

means for merging the subsequent sample HMM with the selected single HMM if the first distance is greater than the second distance whereby the selected single HMM is modified; and means for creating a new subclass, comprising the subsequent sample HMM, if the first distance is less than the shortest second distance.

9. A system for recognizing user specified gestures wherein a specified gesture class has been initialized to include at least one single input gesture, the system comprising:

means for inputting a subsequent gesture to the system, the subsequent gesture belonging to the specified gesture class;

means for training a subsequent sample HMM on the subsequent gesture;

means for comparing the subsequent sample HMM to a threshold HMM to determine therebetween a first distance;

means for comparing the subsequent sample HMM to an HMM or HMMs of at least one subclass belonging to the specified gesture class to determine therebetween a second distance or distances;

means for selecting a single HMM of the HMM of the at least one subclass corresponding to a shortest second distance;

means for merging the subsequent sample HMM with the selected single HMM if the first distance is greater than the second distance whereby the selected single HMM is modified; and, means for creating a new subclass, comprising the subsequent sample HMM, if the first distance is less than the shortest second distance.

10. A system for recognizing user specified gestures, the system comprising:

means for inputting a single gesture;

means for training a sample Hidden Markov Model (HMM) on the single gesture;

means for comparing the sample HMM to a threshold HMM to determine therebetween a first distance;

means for sequentially comparing the sample HMM to a plurality of HMMs to determine respective second distances between the sample HMM and each of the plurality, each of the plurality representing a subclass of gestures;

means for selecting HMMs of the plurality that correspond to second distances that are less than the first distance;

means for computing the probability of the gesture relative to the selected HMMs of the plurality; and, means for determining a subclass to which the gesture most likely belongs based on the computing.

11. A system for recognizing user specified gestures, the system comprising:

means for inputting a single gesture;

means for training a sample Hidden Markov Model (HMM) on the single gesture;

means for comparing the sample HMM to a threshold HMM to obtain first data;

means for sequentially comparing the sample HMM to a plurality of HMMs to determine second data;

means for selecting HMMs of the plurality based on the first and second data;

means for computing the probability of the gesture relative to the selected HMMs of the plurality; and, means for determining a subclass to which the gesture most likely belongs based on the computing.

* * * * *